United States Patent
Garcia

(10) Patent No.: US 9,306,395 B2
(45) Date of Patent: Apr. 5, 2016

(54) WIND TURBINE CONTROLLER APPLYING DIFFERENTIAL POLE CONTROL ALGORITHM

(75) Inventor: Jorge Martinez Garcia, Risskov (DK)

(73) Assignee: Vestas Wind Systems A/S, Aarhus N. (DK)

(*) Notice: Subject to any disclaimer, the term of this patent is extended or adjusted under 35 U.S.C. 154(b) by 739 days.

(21) Appl. No.: 13/578,449

(22) PCT Filed: Feb. 23, 2011

(86) PCT No.: PCT/EP2011/052675
§ 371 (c)(1),
(2), (4) Date: Aug. 10, 2012

(87) PCT Pub. No.: WO2011/104270
PCT Pub. Date: Sep. 1, 2011

(65) Prior Publication Data
US 2012/0306277 A1    Dec. 6, 2012

Related U.S. Application Data

(60) Provisional application No. 61/308,135, filed on Feb. 25, 2010.

(30) Foreign Application Priority Data

Feb. 25, 2010    (DK) .................................. 2010 70068

(51) Int. Cl.
*H02J 1/00*    (2006.01)
*H02J 3/18*    (2006.01)
(Continued)

(52) U.S. Cl.
CPC .............. *H02J 3/1885* (2013.01); *F03D 9/003* (2013.01); *F05B 2270/337* (2013.01);
(Continued)

(58) Field of Classification Search
CPC ........ Y02E 10/763; H02J 1/102; H02J 3/386; H02J 3/38

USPC .................. 307/82, 84; 700/295; 290/44, 55
See application file for complete search history.

(56) References Cited

U.S. PATENT DOCUMENTS

2006/0002791 A1* 1/2006 Moroz .................. F03D 7/0204
416/1
2007/0228838 A1* 10/2007 Delmerico et al. ............. 307/84
(Continued)

FOREIGN PATENT DOCUMENTS

EP         1841036 A2    10/2007
WO    2009092834 A1     7/2009

OTHER PUBLICATIONS

Rodriguez et al., "Automatic Generation Control of a Wind Farm With Variable Speed Wind Turbines", IEEE Transactions on Energy Conversion, vol. 17. No. 2. Jun. 1, 2002.
(Continued)

*Primary Examiner* — Jared Fureman
*Assistant Examiner* — Alfonso Perez Borroto
(74) *Attorney, Agent, or Firm* — Patterson & Sheridan, LLP

(57) ABSTRACT

The present invention relates to a control system and an associated method for controlling an amount of reactive power delivered from a wind power plant to an associated power supply grid, the control system comprising a wind power plant controller and a number of wind turbine controllers each being in communication with said wind power plant controller, wherein the wind power plant controller is adapted to provide a grid voltage reference in response to a required total amount of reactive power to at least one wind turbine controller, said wind turbine controller comprising a voltage control loop comprising means for cancellation of a steady-state local voltage error.

20 Claims, 4 Drawing Sheets

(51) Int. Cl.
  *F03D 9/00*  (2006.01)
  *H02J 3/38*  (2006.01)
(52) U.S. Cl.
  CPC .............. *H02J 3/386* (2013.01); *Y02E 10/72* (2013.01); *Y02E 10/763* (2013.01); *Y02E 40/32* (2013.01); *Y10T 307/707* (2015.04)

(56) References Cited

U.S. PATENT DOCUMENTS

| 2008/0150283 | A1 | 6/2008 | Rivas et al. | |
|---|---|---|---|---|
| 2008/0284252 | A1* | 11/2008 | Jones et al. | 307/82 |
| 2010/0025994 | A1 | 2/2010 | Cardinal et al. | |
| 2010/0133826 | A1* | 6/2010 | Santiago et al. | 290/44 |
| 2010/0134076 | A1 | 6/2010 | Cardinal et al. | |
| 2011/0137474 | A1* | 6/2011 | Larsen | F03D 7/0284 700/287 |

OTHER PUBLICATIONS

European Patent Office, International Search Report issued in related Internation Application No. PCT/EP2011/052675 dated Oct. 6, 2011.
Molina, "Control of tie-line power flow of microgrid including wind generation by DSTATCOM-SMES controller". Energy Conversion Congress and Exposition, 2009.
Danish Patent and Trademark Office, Official Action issued in related Danish application No. PA 2010 70068 dated Oct. 7, 2010.

* cited by examiner a)

b)

WIND TURBINE CONTROLLER APPLYING DIFFERENTIAL POLE CONTROL ALGORITHM

FIELD OF THE INVENTION

The present invention relates to a wind turbine controller. In particular, the present invention relates to a voltage-based wind turbine controller including a differential pole control algorithm for removing steady-state voltage errors due to local voltage slope control.

BACKGROUND OF THE INVENTION

With increasing penetration of wind power generation the requirements for the connection of wind power plants (WPPs) to the electrical grid are defined by new and emerging grid connection codes. The grid connection requirements vary in different parts of the world, but they share common aims, like to permit the development, maintenance and operation of a coordinated, reliable and economical transmission or distribution system.

The new requirements generally demand that WPPs provide ancillary services to support the network in which they are connected. WPPs differ from other generation sources—therefore they are particular in certain aspects of their control. The main differences with the synchronous generators (SGs) are as follows:
- the energy source fluctuates and is unpredictable,
- WPPs are highly modular and composed by a large number of generation units, thus introducing communication delays when sending the operational set points, and these could be in the range of hundredths of milliseconds,
- the SGs provide the reactive power feed directly to the transmission system through their unit transformer which provides a more efficient voltage regulation since the reactive power is not transported over a long distance and through several transformers, and
- wind turbine generators (WTGs) have bigger limitations in their reactive power and current capability due to the size of their electronic power converters.

Therefore, replacing traditional power plants, including their control characteristics during periods of strong wind could be a concern. Grid operators are solving this challenge by means of redacting specific sections in the grid codes for WPP performance.

Normally, the requirements of the utilities can be solved by the wind turbines and the plant controller. The wind power plant control can take place at wind turbine level and/or at plant level. The WPP controller can range from simply passing on references to the wind turbine control systems to performing the majority of closed-loop controls itself.

As voltage control is actuated by reactive power from the wind turbines it is possible to affirm that the voltage control design will cover an inner reactive power/voltage control loop, located at turbine level combined with an outer voltage control loop located at the point of common coupling (PCC) where it is intended to control the voltage.

It may be seen as an object of embodiments of the present invention to provide a wind turbine controller suitable for eliminating local voltage errors.

It may be seen as a further object of embodiments of the present invention to provide a wind turbine controller applying a local voltage control loop for reactive power control.

DESCRIPTION OF THE INVENTION

The above-mentioned objects are complied with by providing, in a first aspect, a control system for controlling an amount of reactive power delivered from a wind power plant to an associated power supply grid, the control system comprising a wind power plant controller and a number of wind turbine controllers each being in communication with said wind power plant controller, wherein the wind power plant controller is adapted to provide a grid voltage reference in response to a required total amount of reactive power to at least one wind turbine controller, said wind turbine controller comprising a voltage control loop comprising means for cancellation of a steady-state local voltage error.

The term wind power plant should be understood broadly thus covering both full scale wind turbine facilities and doubly-fed induction generator (DFIG) configurations. However, the above-mentioned control system is of particular relevance for DFIG configurations.

WPPs deliver reactive power (and active power) to the associated power supply grid at the PCC. Thus, the PCC forms an interface between the WPP and the power supply grid.

It is an advantage of the present invention that by eliminating steady-state local voltage errors at the sites of the wind turbines forming the wind power plant, counteractions from capacitive and inductive reactive power sources can be avoiding. This leads to a fast, stable and efficient voltage control by reactive power injection at the PCC.

Each of the wind turbine controllers may comprise means for cancellation of steady-state local voltage errors, said cancellation means preferably comprising a differential pole control algorithm embedded into suitable electronic means or embedded into software.

The differential pole control algorithm refers to the derivative behaviour of the control system. The derivative behaviour of the control system causes the WTG to react fast to voltage changes at the turbine terminals. The derivative behaviour only occurs until steady-state working conditions have been reached, upon this level, the derivative control will not generate any new reference, thus having only the plant control references active in the control loop.

In the presence of communication delays within the control system the differential pole control algorithm helps the WPP to comply with grid code requirements demanding a very fast response to voltage disturbances. Moreover, the differential pole control algorithm avoids that local voltage controllers at the WTG level induce counteracting behaviours. Such behaviour could be due to the fact that the derivative control of the control system only generates references during transients. During normal or small grid perturbations the influence of the derivative control is neglectable. Thus, a WTG will perform as if there is no local voltage control applied to it.

In a second aspect the present invention relates to a wind power plant comprising a control system according to the first aspect of the present invention.

In a third aspect the present invention relates to a method for controlling an amount of reactive power to be delivered from a wind power plant to an associated power supply grid, wherein the wind power plant comprises a number of wind turbines each being controlled by a local wind turbine controller, and wherein the wind power plant is controlled by a wind power plant controller, said wind power plant controller being in communication with each of said wind turbine controllers, the method comprising the steps of
- providing, from the wind power plant controller, a grid voltage reference to at least one wind turbine controller in response to a required total amount of reactive power,
- determining a local turbine terminal voltage and generating a local voltage reference in accordance with said determination, processing the local voltage reference so as to cancel a steady-state local voltage error, and comparing the grid voltage reference with the processed local voltage reference, and generating a local reactive current reference in response to said comparison.

Again, the term wind power plant should be understood broadly thus covering both full scale wind turbine facilities and DFIG configurations. However, the above-mentioned method is of particular relevance for DFIG configurations.

WPPs deliver reactive power (and active power) to the associated power supply grid at the PCC. Thus, the PCC forms an interface between the WPP and the power supply grid.

It is an advantage of the above-mentioned method that by eliminating steady-state local voltage errors at the sites of the wind turbines forming the wind power plant, counteractions from capacitive and inductive reactive power sources can be avoiding. This leads to a fast, stable and efficient voltage control by reactive power injection at the PCC.

The processing of the local voltage reference may comprise filtering the local voltage reference in accordance with a differential pole filtering. The differential pole filtering may be performed by a differential pole control algorithm embedded into suitable electronic means or embedded into software.

In a fourth aspect the present invention relates to a computer program product for performing the above method when said computer program product is run on, or executed by, a microprocessor.

BRIEF DESCRIPTION OF THE DRAWINGS

The present invention will now be explained in further details with reference to the accompanying drawings, wherein.

Figure 1:
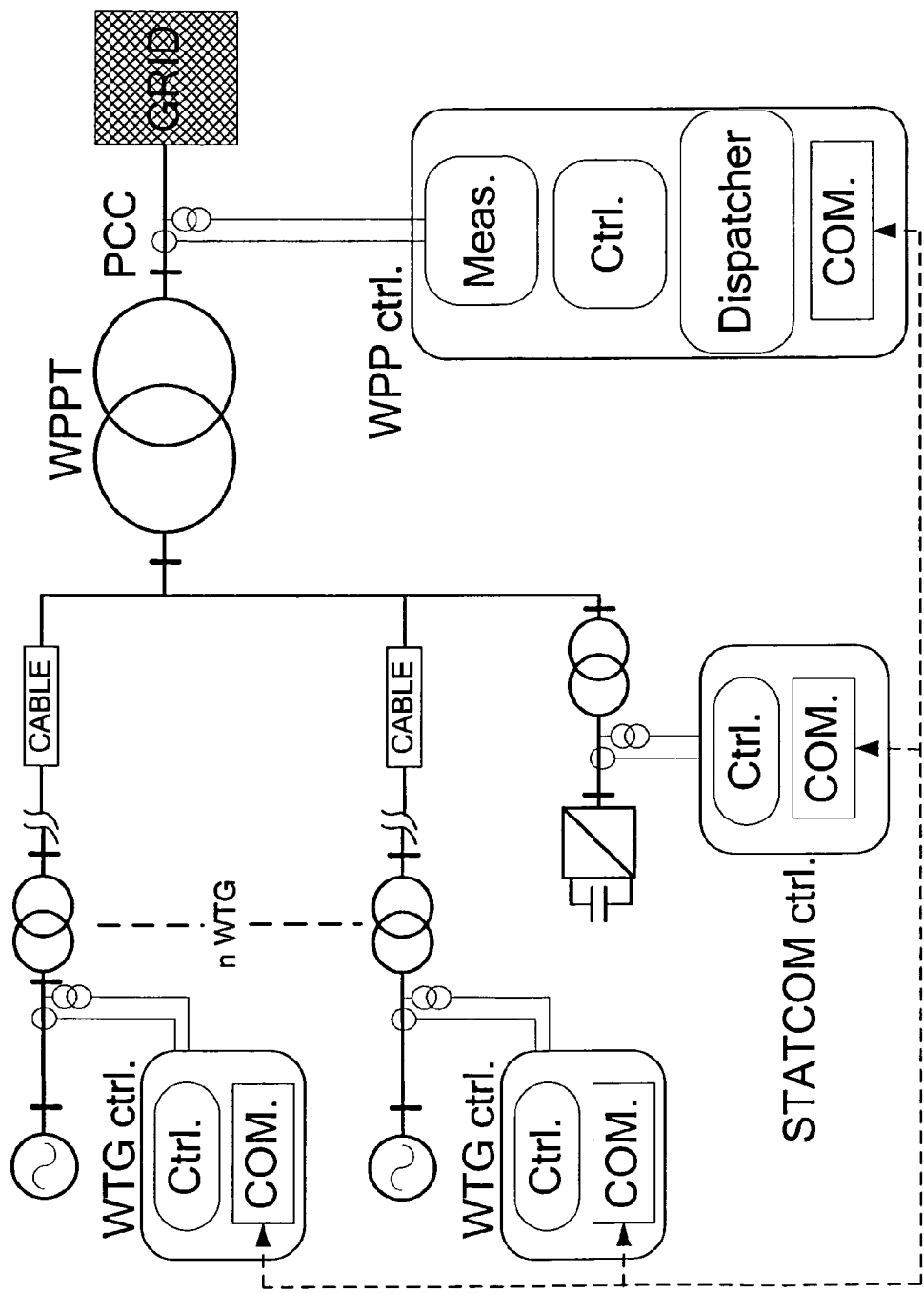
FIG. 1 shows a wind power plant diagram.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In principle the present invention relates to various types of wind turbine configurations including full scale wind turbine facility and in particular DFIG configurations. Since the present invention is of particular relevance for DFIG configurations the invention will, in the following, be described with reference to such configurations.

FIG. 1 shows a WPP controller for controlling the characteristics of the power injected at the PCC. Therefore, a centralized plant controller (WPP ctrl.) is needed to supervise the power injected at PCC. The plant controller receives the references and feedback (measurements) and outputs the turbine set-points. The plant controller is formed by a measurement device, which senses the currents and voltages at the PCC, a dedicated computer which allocates the control algorithms, and a communication hub. The communication hub will exchange control references and other signals with a large amount of WTGs (WTG ctrl.) using the communication WPP Ethernet network and particular protocols.

Still referring to FIG. 1 the dispatcher of the WPP controller has the functionality of splitting the reference calculated by the WPP controller into the different power generating units constituting the WPP. The way of splitting the reference can be done following several strategies, e.g. minimization of lost of energy production. One strategy could be to use a static synchronous compensator (STATCOM) as a reactive power back-up for the system in case the reactive power injected by the WTGs is not sufficient for grid code fulfillment.

Figure 2:
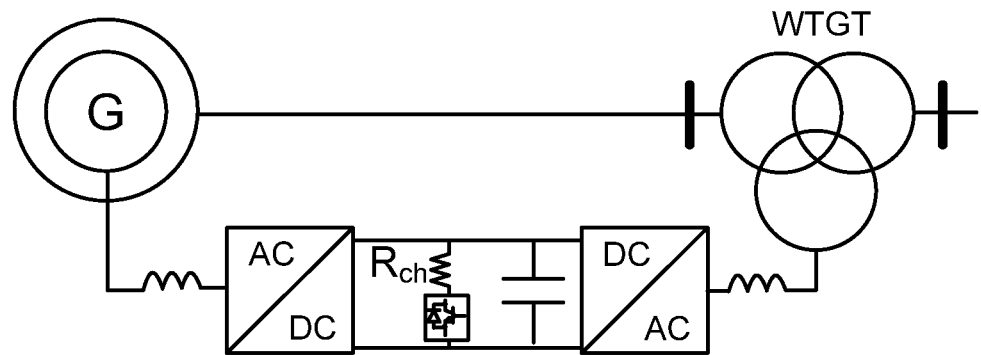
FIG. 2 shows a) a simplified doubly-fed diagram, and b) a simplified doubly-fed controller diagram.
Figure 2:
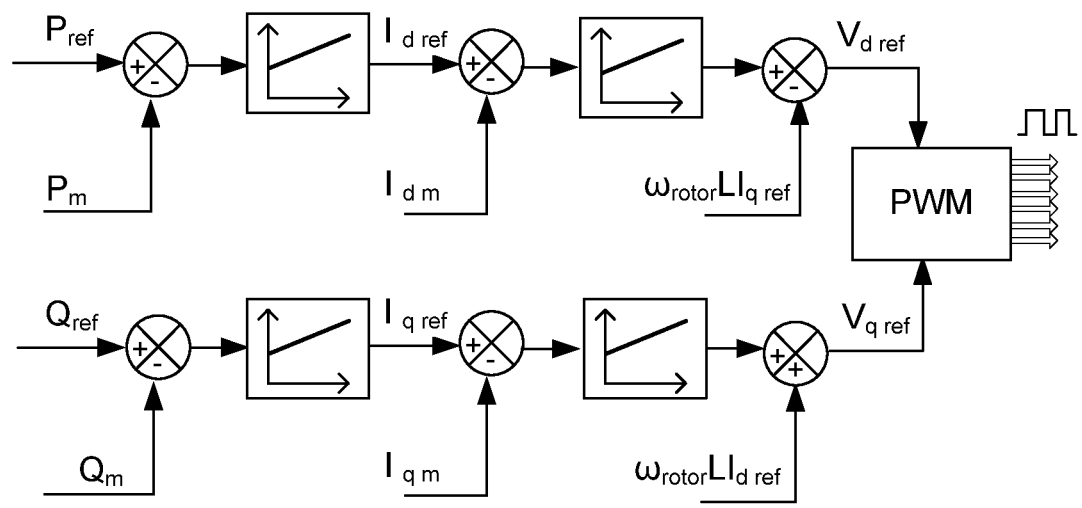

A brief description of the DFIG will be given in the following. Referring to FIG. 2a, the DFIG allows full control of generator active and reactive power using the rotor-connected frequency converter. Its rating is typically in the order of 0.3 pμ. Operating both with sub- and super-synchronous speed, the power can be fed both in and out of the rotor circuit. The rotor-connected converter can employ various power dissipation solutions during severe transients. These solutions mat involve an active crowbar, which is located at the rotor terminals, or a chopper in the DC link, $R_{ch}$—cf. FIG. 2a. The grid converter is used to regulate the voltage level of the DC link.

A simplified control diagram of the DIG controller is depicted in FIG. 2b where the active power, P, and reactive power, Q, are controlled using the d and q axis, respectively. The DFIG controller calculates or receives power references, $P_{ref}$, $Q_{ref}$ from an external controller. These power references are processed using two PI-controllers in cascade; and they will generate the needed voltage references, $V_{d\ ref}$, $V_{q\ ref}$, which are translated by the PWM to pulse the rotor converter. Finally, the rotor is fed with a voltage that produces the desired P and Q at the stator terminals.

Figure 3:
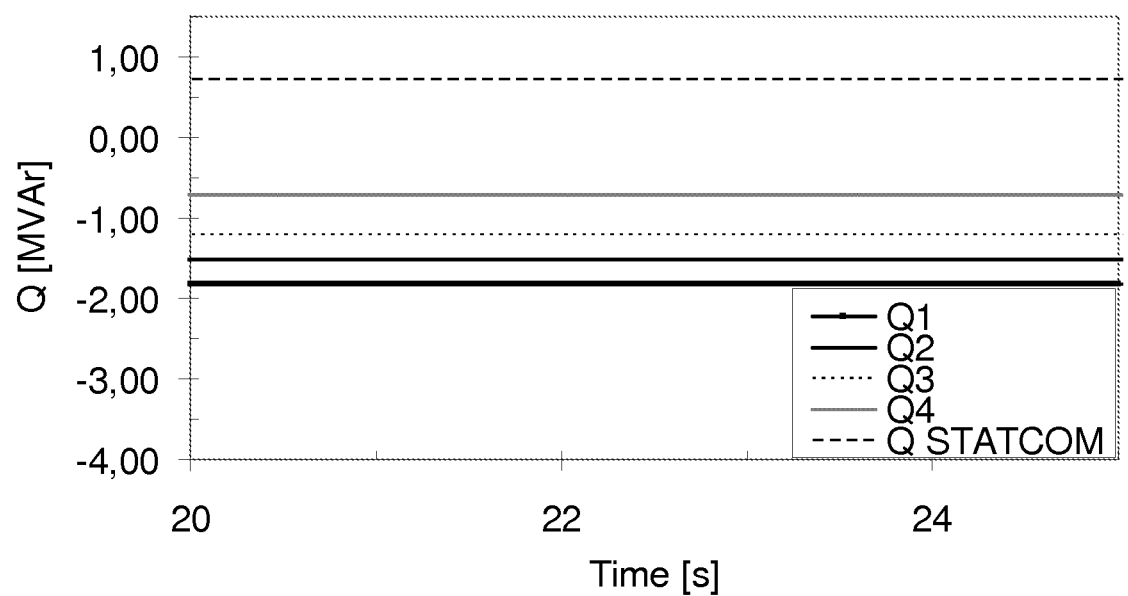
FIG. 3 shows capacitive and inductive reactive power contributions.

Referring now to FIG. 3 typical reactive power contributions from four wind turbines (Q1 ... Q4) and one STATCOM (Q_STATCOM) are depicted. As seen from FIG. 3 Q1 ... Q4 are all inductive reactive power contributions whereas Q_STATCOM is a capacitive reactive power contribution. A mixture of inductive and capacitive reactive power contributions for grid voltage control is inappropriate for stability and efficiency reasons. The present invention aims at avoiding reactive power counteractions among wind power plant units.

Figure 4:
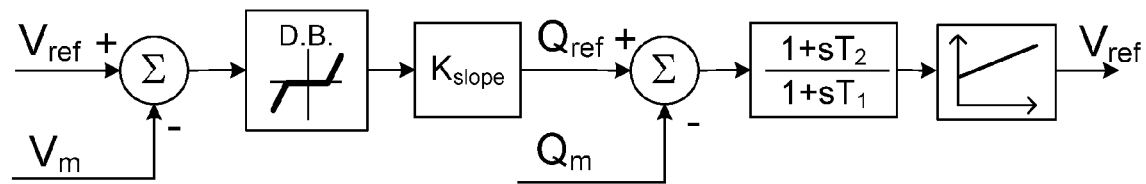
FIG. 4 shows a simplified diagram of a wind power plant controller.
Figure 5:
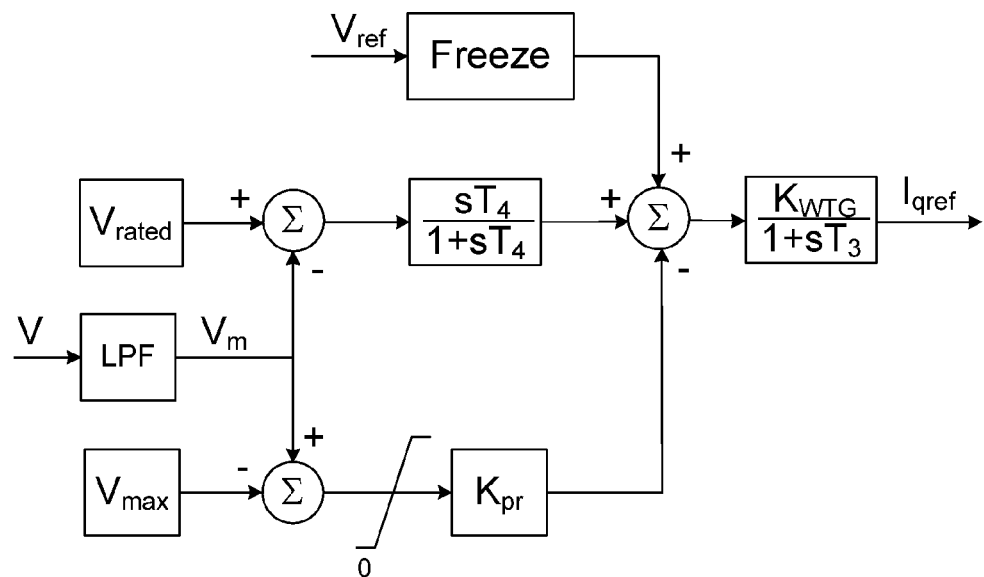
FIG. 5 shows a simplified diagram of a wind turbine controller.

FIG. 4 and FIG. 5 show a typical WPP controller and the WTG controller according to the present invention, respectively.

Firstly, the WPP controller (FIG. 4) is implemented as a secondary voltage controller in order to achieve a fast system reaction and extension of the fulfillment of the design requirements to a wide range of short circuit ratios (SCRs). The secondary voltage control concept is well documented in the literature. The main thrust of the secondary voltage control scheme is to counteract, in real time, reactive power flow changes in the system, by adjusting terminal voltages of WTGs system-wide. The amount of voltage adjustment is proportional to the voltage derivations at monitored buses. The implementation of this concept will be done by adding additional structures in the WTG controller thereby allowing the WTG to react faster to generator terminal voltage changes.

As depicted in FIG. 4 the WPP controller is implemented to provide voltage references, $V_{ref}$, to the WTGs. This new control structure will allow for the improvement of the overall system performance.

Since the slope controller of the WPP controller is meant to inject Q at the PCC proportionally to PCC voltage variations it is important to compensate the Q losses that will occur inside the WPP in order to reach the dictated $Q_{ref}$ by the WPP controller. For this reason, a closed loop using the feedback $Q_m$ is added to the diagram shown in FIG. 4. This will ensure that the Q at PCC is matching with the $Q_{ref}$ calculated by the slope gain and the output of the WPP controller, $V_{ref}$, is sent to every WTGs in the WPP.

Still referring to FIG. 4 the WPP controller is extended with a plant reactive controller which calculates the voltage reference, $V_{ref}$, to be sent to the WTGs. This will ensure that the needed $Q_{ref}$ at PCC is injected and the references sent to the WTGs are not in conflict with the WPP controller structure.

A WTG reactive power control is shown in FIG. 5. As seen, the reactive current reference, $I_{qref}$, is generated according to the difference between the stator turbine terminal voltage, represented by V in FIG. 5, and the voltage reference, $V_{ref}$, sent by the WPP controller. Therefore, the WTG outer control loop is changed from a traditional reactive power control following Q references, to a local voltage control which can be adjusted by an external set-point.

The WTG gain and time constant, $K_{WTG}$ and $T_3$, respectively, are calculated to provide fast reactions to voltage changes at generator terminals.

The WTG controller includes protection against DFIG stator overvoltage performed by a secondary loop. The measured voltage, V, at the turbine terminals is low-pass filtered (LPF) and the filtered voltage, $V_m$, is compared with a maximum voltage level $V_{max}$. In the case that the $V_m$ is greater than $V_{max}$, the gain $K_{pr}$ will multiply the difference between $V_m$ and $V_{max}$ and this value will be subtracted from the $V_{ref}$. Another voltage protection is installed in that the voltage reference, $V_{ref}$, is compared to threshold levels defined by $V_{rated}$. These levels are normally around 1.1 and 0.9 pµ.

If $V_m$ is greater or lower than these threshold levels, and $V_{ref}$ increases or decreases, respectively, the block "Freeze", which is allocating this supervisory condition, will freeze this external reference until these conditions are in place.

The differential pole algorithm defined by $$\frac{sT_4}{1+sT_4}$$

ensures that local steady-state voltage errors are eliminated thereby avoiding the reactive power counteractions depicted in FIG. 3.

The time constant $T_4$ of the differential pole may be changeable in order to adapt to certain grid conditions, such as the grid voltage. Thus, $T_4$ can be a constant that is predefined off-line, or it can be a changeable time constant that can be adjusted on-line according to grid conditions.

Thus, by implementing the control scheme of the present invention in wind power plants a fast, stable and effective voltage control by reactive power injection is provided.

The invention claimed is:

1. A control system for controlling reactive power delivered from a wind power plant to an associated power supply grid, the control system comprising:
a plurality of wind turbine controllers; and
a wind power plant controller communicatively coupled with each of the plurality of wind turbine controllers,
wherein the wind power plant controller is adapted to provide, based on a determined total amount of reactive power to be delivered to the power supply grid, a grid voltage reference to at least a first wind turbine controller of the plurality of wind turbine controllers,
wherein the first wind turbine controller comprises a voltage control loop comprising means for mitigating a steady-state local voltage error in a wind turbine of the wind power plant that is controlled by the first wind turbine controller, and
wherein the first wind turbine controller is configured to generate a reactive current reference for the wind turbine based on the received grid voltage reference and further based on an output of the voltage control loop.

2. The control system of claim 1, wherein each of the plurality of wind turbine controllers comprises means for mitigating respective steady-state local voltage errors.

3. The control system of claim 1, wherein the means for mitigating a steady-state local voltage error comprises a differential pole control algorithm implemented in the voltage control loop.

4. The control system of claim 1, wherein the first wind turbine controller is configured to generate the reactive current reference without receiving an external reactive current reference from the wind power plant controller.

5. The control system of claim 1, wherein the first wind turbine controller further comprises:
a measurement device configured to determine a terminal voltage of the corresponding wind turbine,
wherein the first wind turbine controller is further configured to generate a local voltage reference based on the determined terminal voltage, wherein mitigating the steady-state voltage error is based on comparing the grid voltage reference with the local voltage reference.

6. The control system of claim 5, wherein the first wind turbine controller further comprises first and second predetermined threshold levels, and is further configured to:
upon determining at a first time that the filtered voltage falls outside a range defined by the first and second threshold levels, halting updating of the grid voltage reference for use in the comparison of the grid voltage reference with the local voltage reference.

7. The control system of claim 6, wherein the first wind turbine controller is further configured to:
upon determining at a second time that the filtered voltage falls within the range, resuming updating of the grid voltage reference.

8. A wind power plant operatively coupled with a power supply grid, the wind power plant comprising:
a wind power plant controller; and
a plurality of wind turbines, each controlled by a respective wind turbine controller communicatively coupled with the wind power plant controller,
wherein the wind power plant controller is configured to provide, based on a determined total amount of reactive power to be delivered to the power supply grid, a grid voltage reference to at least a first wind turbine controller,
wherein the first wind turbine controller comprises a voltage control loop comprising means for mitigating a steady-state local voltage error in a wind turbine that is controlled by the first wind turbine controller, and
wherein the first wind turbine controller is configured to generate a reactive current reference for the wind turbine based on the received grid voltage reference and further based on an output of the voltage control loop.

9. A method for controlling reactive power delivered from a wind power plant to an associated power supply grid, the wind power plant controlled by a wind power plant controller and comprising a plurality of wind turbines each controlled by a respective wind turbine controller communicatively coupled with the wind power plant controller, the method comprising:

provinding, from the wind power plant controller and based on a determined total amount of reactive power to be delivered to the power supply grid, a grid voltage reference to at least a first wind turbine controller corresponding to at least a first wind turbine of the plurality of wind turbines;

generating, using the first wind turbine controller and based on a determined terminal voltage of the first wind turbine, a local voltage reference;

processing the local voltage reference so as to mitigate a steady-state local voltage error; and generating, using the first wind turbine controller, a reactive current reference for the first wind turbine based on comparing the grid voltage reference with the processed local voltage reference.

10. The method of claim 9, wherein processing the local voltage reference comprises filtering the local voltage reference using differential pole filtering.

11. The method of claim 10, wherein the differential pole filtering is performed by a filter having a transfer function:

$$\frac{sT_4}{1+sT_4},$$

where $T_4$ represents a time constant of the differential pole.

12. The method of claim 11, wherein the time constant $T_4$ is a predetermined value.

13. The method of claim 11, wherein the time constant $T_4$ is updated based on conditions of the power supply grid.

14. A computer program product for performing the method of claim 9 when said computer program product is run on, or executed by, a microprocessor.

15. The method of claim 9, further comprising:
low-pass filtering the determined terminal voltage to produce a filtered voltage, wherein the steady-state local voltage error is based on the filtered voltage.

16. The method of claim 15, further comprising:
comparing the filtered voltage with one or more predetermined threshold levels;
wherein the steady-state local voltage error is the based on the comparison.

17. The method of claim 16, wherein the one or more predetermined threshold levels include first and second threshold levels, the method further comprising:
upon determining at a first time that the filtered voltage falls outside a range defined by the first and second threshold levels, halting updating of the grid voltage reference for use in the comparison of the grid voltage reference with the processed local voltage reference; and
upon determining at a second time that the filtered voltage falls within the range, resuming updating of the grid voltage reference.

18. The method of claim 15, further comprising:
upon determining that the filtered voltage exceeds a predetermined maximum voltage level for the first wind turbine by a difference amount, generating a multiplicative product of the difference amount with a predetermined gain,
wherein generating the reactive current reference for the first wind turbine is further based on the multiplicative product.

19. The method of claim 18, wherein generating the reactive current reference for the first wind turbine comprises applying a filter to a sum of the grid voltage reference and the processed local voltage reference minus the multiplicative product.

20. The method of claim 9, wherein the first wind turbine controller generates the reactive current reference for the first wind turbine without receiving an external reactive current reference from the wind power plant controller.

* * * * *